United States Patent

Vagarali

[11] Patent Number: 5,869,015
[45] Date of Patent: Feb. 9, 1999

[54] METHOD FOR PRODUCING CUBIC BORON NITRIDE USING MELAMINE AS A CATALYST

[75] Inventor: Suresh S. Vagarali, Columbus, Ohio

[73] Assignee: General Electric Company, Pittsfield, Mass.

[21] Appl. No.: 72,144

[22] Filed: May 4, 1998

[51] Int. Cl.$^6$ .................................................. C01B 21/064
[52] U.S. Cl. .......................................................... 423/290
[58] Field of Search ............................................. 423/290

[56] References Cited

U.S. PATENT DOCUMENTS

| | | |
|---|---|---|
| 2,597,087 | 5/1952 | Cowgill . |
| 2,941,241 | 6/1960 | Strong . |
| 2,941,248 | 6/1960 | Hall . |
| 2,947,611 | 8/1960 | Bundy . |
| 2,947,617 | 8/1960 | Wentorf, Jr. . |
| 3,136,615 | 6/1964 | Bovenkerk et al. . |
| 3,233,988 | 2/1966 | Wentorf, Jr. et al. . |
| 3,241,919 | 3/1966 | O'Connor ............................ 423/290 |
| 3,609,818 | 10/1971 | Wentorf, Jr. . |
| 3,743,489 | 7/1973 | Wentorf, Jr. et al. . |
| 3,767,371 | 10/1973 | Wentorf, Jr. et al. . |
| 3,768,972 | 10/1973 | Taylor et al. ............................ 423/290 |
| 3,772,428 | 11/1973 | De Vries et al. . |
| 3,852,078 | 12/1974 | Wakatsuki et al. . |
| 3,876,751 | 4/1975 | Alexeevsky et al. . |
| 3,918,219 | 11/1975 | Wentorf, Jr. et al. . |
| 3,918,931 | 11/1975 | De Vries et al. . |
| 4,188,194 | 2/1980 | Corrigan . |
| 4,289,503 | 9/1981 | Corrigan . |
| 4,334,928 | 6/1982 | Hara et al. . |
| 4,361,543 | 11/1982 | Zhdanovich et al. ............................ 423/290 |
| 4,389,465 | 6/1983 | Nakai et al. . |
| 4,394,170 | 7/1983 | Sawaoka et al. . |
| 4,403,015 | 9/1983 | Nakai et al. . |
| 4,409,193 | 10/1983 | Sato et al. . |
| 4,673,414 | 6/1987 | Lavens et al. . |
| 4,810,479 | 3/1989 | Biardeau et al. . |
| 4,954,139 | 9/1990 | Cerutti . |
| 5,618,509 | 4/1997 | Shioi et al. ............................ 423/290 |

FOREIGN PATENT DOCUMENTS

| | | | |
|---|---|---|---|
| 8800 | 1/1975 | Japan ............................ | 423/290 |
| 199513 | 11/1984 | Japan ............................ | 423/290 |
| 170406 | 7/1993 | Japan ............................ | 423/290 |

OTHER PUBLICATIONS

Synthesis of Cubic Boron Nitride by Saito et al. (Yogyo–Kyokai Shi, vol. 78, No. 893), (no date available).

*Primary Examiner*—Wayne Langel

[57] ABSTRACT

An improved process for converting hexagonal boron nitride (HBN) particles into cubic boron nitride (CBN) in a high pressure/high temperature apparatus (HP/HT) is disclosed. More specifically, by using melamine as a catalyst, operating pressures and temperatures as well as catalyst costs, may all be reduced.

7 Claims, No Drawings

5,869,015

METHOD FOR PRODUCING CUBIC BORON NITRIDE USING MELAMINE AS A CATALYST

FIELD OF THE INVENTION

The present invention relates to an improved method of converting hexagonal boron nitride (HBN) into cubic boron nitride (CBN). The disclosed method, which utilizes melamine as a catalyst, represents a dramatic improvement over the prior art in both cost and performance. The low cost (in comparison to currently available alternative catalysts) melamine catalyst allows the conversion process to proceed at lower pressures and temperatures.

BACKGROUND OF THE INVENTION

Cubic boron nitride is second only to diamond in hardness but has a greater chemical stability, and is therefore becoming increasingly more important as a grinding, polishing and cutting material.

U.S. Pat. No. 4,188,194 describes a process for making sintered polycrystalline CBN compacts which utilizes pyrolytic boron nitride (PBN) in the absence of any catalyst. An improvement on this direct conversion process is disclosed in U.S. Pat. No. 4,289,503 wherein boric oxide is initially removed from the surface of the HBN powder.

A variety of methods have been proposed and used in the production of CBN, but the most well-known of these, which is widely used commercially, is a method of converting HBN to CBN under the high-temperature/high-pressure (HT/HP) conditions of about 50–75 Kbar and 1400°–1600° C. in the presence of a catalyst.

Typical catalysts for the HP/HT process have conventionally been nitrides, amides, fluorides of alkaline and alkaline earth elements, urea, aluminum nitride, Fe-Al and Mg-Al alloys, nitrides and boronitrides of alkali metals and alkaline earth metals. Of these, lithium-type catalysts have been thoroughly studied, and lithium nitride and lithium boronitride are considered to be particularly effective catalysts (see, for example, U.S. Pat. No. 3,772,428).

One method of converting HBN to CBN employs at least one catalyst selected from the class consisting of alkali metals, alkaline earth metals, lead, antimony, tin and nitrides of these metals as described by Wentorf Jr. in U.S. Pat. No. 2,947,617, incorporated herein by reference.

Another method employing $Fe_3Al$ and certain silver-cadmium alloys as catalysts in the conversion of HBN to CBN has been described in "Synthesis of Cubic Boron Nitride" by Saito et al. (Yogyo-Kyokai Shi, Vol. 78, No. 893).

Another method employs aluminum alloys of cobalt, nickel and manganese as catalysts for the conversion of HBN to CBN at HP/HT conditions. The habit and size of the CBN crystals developed depends on whether HBN or a mixture of HBN and CBN crystals (or sintered carbide grains) is employed with the catalyst metal. This method is described by Wentof, Jr., et al. in U.S. Pat. No. 3,918,219, incorporated herein by reference.

Even with the use of catalysts, the pressures and temperatures required for CBN growth are high, e.g., 50–75 Kbar and 1400°–1800° C., which necessitates the use of a belt type HP/HT apparatus such as described in U.S. Pat. Nos. 4,409,193, 4,810,479 and 2,947,617 and French Pat. No. 2,597,087.

CBN can also be grown at lower pressures, approximately 30 Kbar, using hydrazine ($NH_2NH_2$) as a catalyst. However, use of this catalyst is not practical because hydrazine is a carcinogen, is highly corrosive, flammable, and reactive, and is potentially explosive when it comes in contact with air.

CBN cutting and abrasive tools are typically in the form of compacts. A compact is a mass of abrasive particles bonded together in a self-bonded relationship (see U.S. Pat. Nos. 3,852,078 and 3,876,751); by means of a bonding medium (see U.S. Pat. Nos. 3,136,615, 3,233,988, 3,743,489, 3,767,371, and 3,918,931); or by means of combinations thereof. A composite compact is a compact bonded to a substrate material, such as cemented metal carbide. Compacts or composite compacts may be used in blanks for cutting tools, drill bits, dressing tools, and wear parts (see U.S. Pat. Nos. 3,136,615 and 3,233,988).

Sintered CBN/cermet compacts prepared by HP/HT pressing of mixtures of CBN, various cermets, and aluminum compounds (with or without metal additions) are disclosed in U.S. Pat. Nos. 4,334,928 and 4,389,465. U.S. Pat. No. 4,394,170 proposes a composite sintered compact containing high density BN (CBN and Wurtzite boron nitride, WBN), ceramic and various metal bases obtained by HP/HT processing of mixtures of CBN, WBN, and various ceramic and metal mixtures. A supported version of such CBN/cermet compact is disclosed in U.S. Pat. No. 4,403,015. These prior CBN cermet compact disclosures, however, must initially make the CBN in one HP/HT step and the CBN cermet product in a second HP/HT step. This necessarily results in extra wear on the HP/HT presses, reduced throughput, and increased manufacturing costs result from the use of two different HP/HT processing operations.

The above-mentioned catalysts and processes all require high temperature and high pressure to obtain CBN in sufficient yields and therefore are less than desirable from an industrial point of view. Also, the CBN obtained by use of said catalysts have irregular shapes or nearly spherical shapes, poor in development of euhedral planes.

It is an object of the present invention, in the light of these circumstances, to provide a method of converting HBN to CBN with a high yield, using lower temperatures and pressures than are currently practised.

It is a further object of the present invention to provide a method of converting HBN to CBN in high yield using temperatures and pressures lower than the prior art through the use of a stable and relatively inexpensive catalyst.

These and other objects of the invention are accomplished in a standard HP/HT process by using melamine ($C_3H_6N_6$) as a catalyst.

SUMMARY OF THE INVENTION

An improved process for converting HBN into CBN is disclosed. Said process includes the steps of:

a) placing HBN particles and a catalyst mixture in an HP/HT apparatus;

b) subjecting said mixture to HP/HT conditions for a time adequate for HBN to be converted to CBN, and c) recovering CBN from said apparatus.

The improvement in the process according to the present invention comprises the use of melamine as the catalyst for HBN conversion.

The disclosed process provides a number of advantages over the prior art, including the ability to produce CBN at lower pressures and temperatures. Another advantage is the extension of the useful life of the HP/HT apparatus through the use of lower pressures and temperatures. A further advantage springs from the fact that melamine is significantly less expensive than catalysts presently used such as lithium amide. These and other advantages will become readily apparent to those skilled in the art based upon the within disclosure.

DETAILED DESCRIPTION OF THE INVENTION

Melamine ($C_3H_6N_6$) is a cyclic compound having a six-membered ring of alternating C and N atoms, with three $NH_2$ groups. It is available in white powder form and has a melting point of 354° C., which is lower than melting points of catalysts currently used for CBN growth. The powder is stable in air, easy to handle, and relatively inexpensive. The chemical structure of melamine contains three amine radicals ($NH_2$) similar to that in lithium amide and hence can be used as a catalyst for CBN.

Physical and chemical properties of melamine are as follows:

TABLE 1

| Appearance | Fine, white crystalline powder |
|---|---|
| Boiling point | n/a (sublimes) |
| Melting point | 354° C. (decomposes) |
| Specific gravity | 1.573 (14° C.) |
| Vapor pressure | 50 mm Hg (315° C.) |
| Vapor density | 4.34 (air = 1) |
| Heat of combustion | 468.9 kcal/mole |
| Bulk density | 50–55 lbs/ft$^3$ |
| Solubility in water | 0.4 g/100 mL at 20° C.; 5.0 g/100 mL at 100° C. |

Melamine is nonflammable, as the crystals sublime rather than ignite. It is also not explosive; a dust cloud concentration up to 2.0 oz. per cubic foot s does not ignite when subjected to a 12,000 volt AC arc at a maximum of 360 watts. Melamine is incompatible with strong oxidizers and strong acids. It is stable for two weeks at temperatures up to 60° C. Solutions in water, dimethyl sulfoxide, 95% ethanol or acetone should be stable for 24 hours under normal lab conditions.

This compound is used in the synthesis of melamine resins, laminates, surface coating resins, plastic molding compounds, paper products, textile resins, bonding resins, gypsum-melamine resin mixtures, orthopedic casts, rubber additives, chemotherapeutic agents, additives to animal and poultry feeds, leather tanning, stabilizer for aqueous formaldehyde solutions, in dyeing operations, as ion-exchange material, sterilizing agent, in silver tarnish cleaners and in neutralizer solutions for permanent wave preparations. (See NTP Chemical Repository, Radian Corporation, Aug. 29, 1991, Melamine).

The HBN used as the starting material may be commercially available HBN powder. Oxygen impurities in the form of boron oxide, etc., slow the conversion from HBN to CBN, and thus materials with low oxygen contents are preferred. The granularity thereof is not particularly restricted, but generally 150 mesh or lower is suitable. This is because too great a granularity may result in a lower reactivity with the catalyst.

The production of CBN from HBN may be achieved with a conventional HP/HT apparatus of the belt- or die-type described, for example, in U.S. Pat. Nos. 2,947,611, 2,941, 241, 2,941,248, 3,609,818, 3,767,371, 4,289,503, 4,673,414, and 4,954,139. Other HP/HT apparatuses also are useful in accordance with the present invention, provided that they are capable of providing the required HP/HT conditions required. Accordingly, it is intended that such other HP/HT apparatuses fall within the scope of the present invention.

In all other respects, but for pressure and temperature, the present invention operates like currently used commercial operations that grow CBN from HBN or other low-pressure boron nitride. Accordingly, it should be understood that other forms of low-pressure boron nitride are also included for use in the present invention such as, for example, amorphous and turbostatic forms of boron nitride.

In carrying out the present invention, the mixture of HBN particles and melamine catalyst is placed in an HP/HT apparatus, such as described in U.S. Pat. No. 4,289,503, and placed under pressure and temperature for a time sufficient for CBN growth to occur. The sample is then allowed to cool under pressure as is known in the art to inhibit reconversion or back conversion of CBN to HBN. The pressure is then decreased to atmospheric pressure and CBN crystals are recovered.

Conditions in the cell include a temperature of at least 1300° C., but should be less than the CBN reconversion temperature. Preferably, the temperature should range from about 1300° to about 1800° C. Pressures are less than those normally encountered in present-day commercial CBN growth and should be expected to range from 30 to 75 Kbars. The time necessary for CBN growth to occur will depend on the temperature and pressure chosen, again as is well known in the art.

It should be understood that the preferred temperatures and pressured specified herein are estimates only. The high pressure art will recognize such variances due to the difficulty in precisely measuring the high pressures and temperature encountered in this field. Therefore, according to the process of the present invention, the conditions of temperature and pressure should be adequate for CBN growth to occur and should be maintained for a time adequate such that CBN growth will occur.

The resulting CBN may be subject to milling or size attrition for the production of CBN particles which may be used in making resin bonded grinding wheels, metal bonded grinding wheels, metal bonded saw elements, and like conventional cutting and abrasive tools.

In order to compare the process of the present invention with a typical prior art process, 500 gram blends were made with the following compositions:

TABLE 2

|  | Blend No. 1 (wt. %) | Blend No. 2 (wt. %) |
|---|---|---|
| Lithium amide | 14.3 | — |
| Melamine | — | 14.0 |
| Lithium hydride | 3.0 | 6.0 |
| HBN | 82.7 | 80.0 |

The blends were mixed in a tubular blender for 30 minutes and were then densified by isopressing and granulating. The densified powder blends were pressed into pills which were loaded into a standard HP/HT cell. The pill weight was approximately 21.0 grams and there were 10 pills per tube. Two cells were produced for each blend. These cells were run on a commercial HP/HT belt apparatus using standard cell assemblies and profile, except that both pressure and wattage (which corresponds to temperature) were reduced. After the completion of the run, the cells were visually examined for CBN growth. The results are given below:

TABLE 3

| Blend | Initial Pressure (psi) | Initial Power (watts) | Results of Visual Examination |
|---|---|---|---|
| #1 | 3250 | 8750 | CBN growth |
| #1 | 3250 | 8750 | CBN growth |
| #2 | 3250 | 8700 | CBN growth |
| #2 | 3200 | 8500 | CBN growth |

The CBN crystals obtained from blends 1 and 2 were essentially similar in color, the color being light yellow. These results demonstrate that melamine can be used as catalyst for growing CBN at pressures and temperatures which are less than those currently used with lithium amide. Moreover, the cost of melamine is substantially less than the cost of lithium amide. Thus, the melamine catalyst of the present invention provides the same benefits (i.e., reduced pressures and temperatures) that have been reported in connection with the use of a hydrazine catalyst, but without the threat of explosion.

While the invention has been described and illustrated in connection with certain preferred embodiments thereof, it will be apparent to those skilled in the art that the invention is not limited thereto. Accordingly, it is intended that the appended claims cover all modifications which are within the spirit and scope of the present invention. All references cited herein are expressly incorporated herein by reference.

I claim:

1. An improved process for converting hexagonal boron nitride (HBN) into cubic boron nitride (CBN), said process comprising the steps of:

a) placing a mixture of HBN and a melamine catalyst in a HP/HT apparatus;

b) subjecting said mixture to HP/HT conditions for a time adequate for HBN to be converted to CBN, and c) recovering CBN from said apparatus.

2. The process of claim 1, wherein said melamine catalyst is present in an amount ranging from approximately 5% to 50% by weight of said HBN.

3. The process of claim 1, wherein said melamine catalyst is present in an amount ranging from approximately 10% to 20% by weight of said HBN.

4. The process of claim 1, wherein said high pressure conditions range from about 30 to about 75 kbars.

5. The process of claim 1, wherein said high temperature conditions range from about 1300° and 1800° C.

6. The process of claim 1, wherein said CBN is recovered as monocrystalline CBN particles.

7. The process of claim 1, wherein said HBN comprises at least one member selected from the group consisting of amorphous and turbostatic forms of boron nitride.

* * * * *